United States Patent [19]

Sauerwein

[11] 4,272,996

[45] Jun. 16, 1981

[54] SCOTCH YOKE HAVING A CURVED TRACK

[75] Inventor: William D. Sauerwein, Joppa, Md.

[73] Assignee: Black & Decker Inc., Newark, Del.

[21] Appl. No.: 50,044

[22] Filed: Jun. 19, 1979

[51] Int. Cl.³ .................... B27B 11/02; F16H 21/18
[52] U.S. Cl. .......................................... 74/50; 30/394
[58] Field of Search .............................. 30/392–394, 30/220, 241; 74/50

[56] References Cited

U.S. PATENT DOCUMENTS

| 245,771 | 8/1881 | Bond | 74/50 |
|---|---|---|---|
| 543,768 | 7/1895 | Haag | 74/50 |
| 644,014 | 2/1900 | Jackson | 74/50 |
| 735,717 | 8/1903 | Dalmas | 74/50 |
| 1,505,856 | 8/1924 | Briggs | 74/50 |
| 1,621,103 | 3/1927 | Brumell | 74/50 |
| 2,931,402 | 4/1960 | Papworth | 74/50 |
| 3,451,276 | 6/1969 | Wadlow et al. | 74/50 |
| 3,890,708 | 6/1975 | Bauer | 30/393 |

FOREIGN PATENT DOCUMENTS

| 933625 | 1/1948 | France | 30/392 |
|---|---|---|---|
| 22694 | of 1902 | United Kingdom | 74/50 |
| 223350 | 10/1924 | United Kingdom | 74/50 |
| 1406281 | 9/1975 | United Kingdom | 30/393 |

*Primary Examiner*—Lawrence J. Staab
*Attorney, Agent, or Firm*—Leonard Bloom; Edward D. Murphy; Harold Weinstein

[57] ABSTRACT

For a power tool having a reciprocating drive mechanism, an improved one-piece scotch yoke having a curved track design which substantially eliminates the contact pressure between the yoke and guides created in conventional straight track designs by the couple on the reciprocating yoke shaft imposed by the non-collinear blade and crank loads. The radius of curvature of the yoke track is preferably equal to the distance from the shaft bearing to the crank pin at its mid-stroke position where the velocity of the yoke is greatest.

12 Claims, 7 Drawing Figures

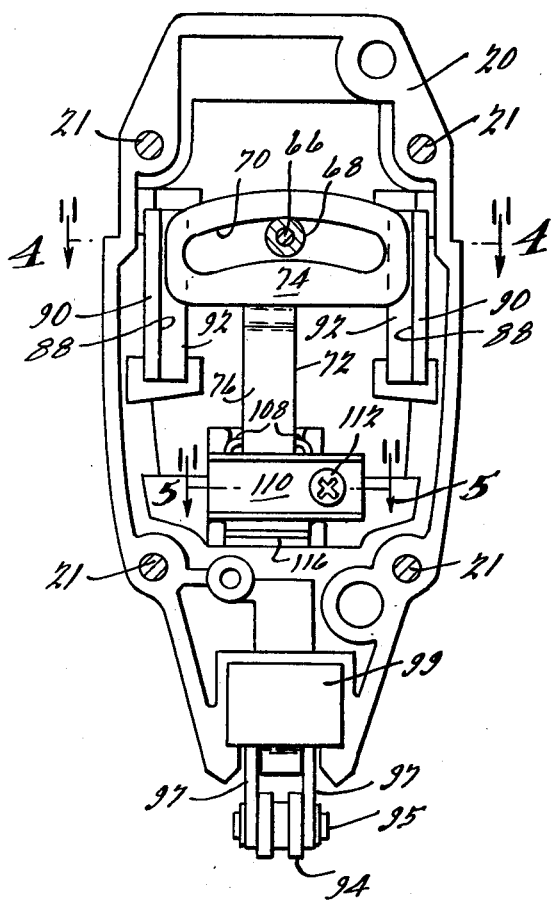
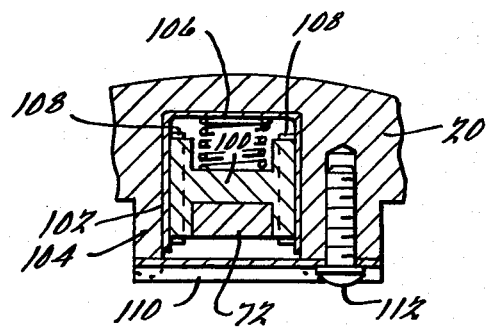
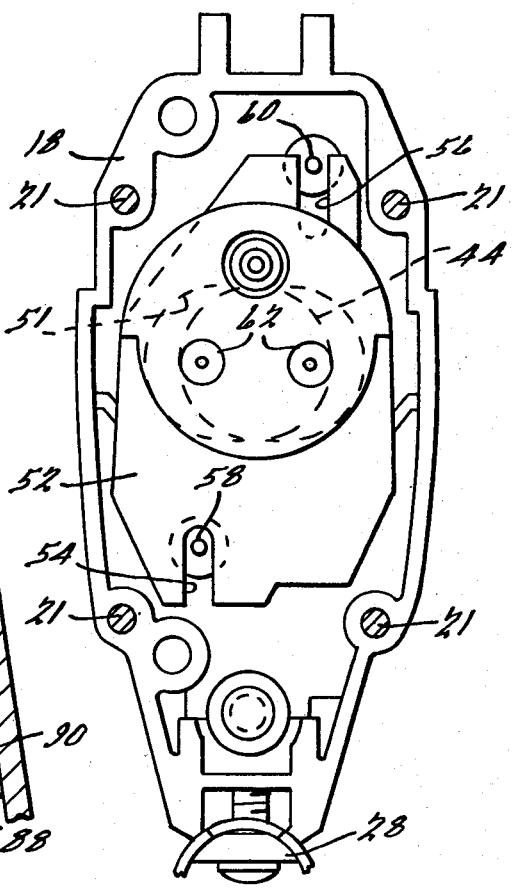

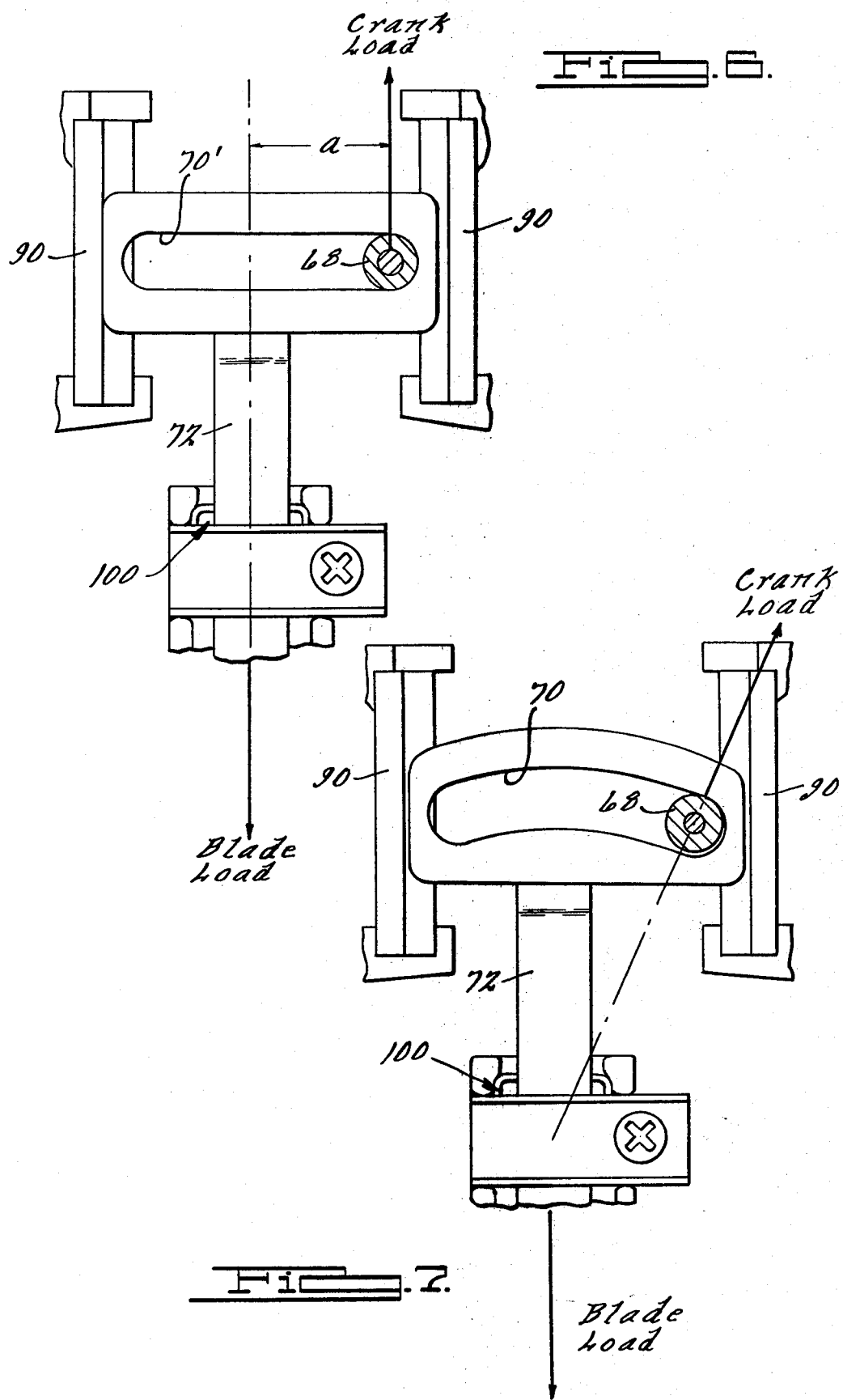

SCOTCH YOKE HAVING A CURVED TRACK

BACKGROUND AND SUMMARY OF THE INVENTION

The present invention relates to power tools, and in particular to power tools having reciprocating drive mechanisms. Since jig saws are the most common type of power tool having a reciprocating drive mechanism, the present invention will be discussed in this connection. However, it is to be understood that the present invention has general applicability to any power tool that utilizes a reciprocating drive mechanism of the scotch yoke type.

Jig saws of the general type to which the present invention pertains typically comprise an electric motor which drives a reciprocating saw blade drive mechanism of the scotch yoke type. More particularly, the motor shaft is mechanically coupled to a crank plate having an eccentrically located crank pin that is drivingly disposed within the slot or "track" of a reciprocating yoke member. The yoke member is then generally coupled to the saw blade carrier. In all known prior art designs, the configuration of the yoke track is straight, perpendicular to the shaft of the yoke, with the length of the track equal to the diameter of the circle traced by the crank pin.

Although certainly functional, the disadvantage of the straight track design is that it creates a couple on the shaft of the yoke, the moment of which is greatest at the mid-stroke of the yoke where the velocity of the yoke is greatest. Consequently, since the bearing load factor is directly related to the product of pressure and velocity, it can be seen that the straight track design actually generates excessive bearing load since both factors are at a maximum at the same points during the stroke. Thus, a substantial side load is imposed on the yoke guide which causes increased friction and consequent heat buildup in the tool.

Accordingly, it is the primary object of the present invention to provide a scotch yoke design having a track configuration that minimizes the side load forces imposed on the yoke guides and thereby substantially eliminate the friction and heat generation normally associated with the yoke guides. In general, this is accomplished by fashioning the yoke with a curved track to eliminate the couple on the yoke shaft which results from the straight track configuration. In addition, as will subsequently be described in greater detail, the radius of curvature of the yoke track is selected in the peferred embodiment to be substantially equal to the distance between the crank pin and the center or the lower shaft bearing when the yoke is at its midstroke position so that the yoke guide load is perfectly balanced when the velocity of the reciprocating yoke is greatest.

Additional objects and advantages of the present invention will become apparent from a reading of the detailed description of the preferred embodiment which makes reference to the following set of drawings in which:

BRIEF DESCRIPTION OF THE DRAWINGS

FIG. 2 is a transverse sectional view taken along line 2-2 in FIG. 1;

FIG. 3 is a transverse sectional view taken along line 3—3 in FIG. 1;

FIG. 4 is an enlarged fragmentary horizontal sectional view taken generally along line 4—4 in FIG. 2;

FIG. 5 is an enlarged fragmentary horizontal sectional view taken generally along line 5—5 in FIG. 2;

FIG. 6 is a fragmentary view of a yoke design having a conventional straight track; and FIG. 7 is a fragmentary view of a yoke design having a curved track according to the teachings of the present invention.

DESCRIPTION OF THE PREFERRED EMBODIMENT

Figure 1:
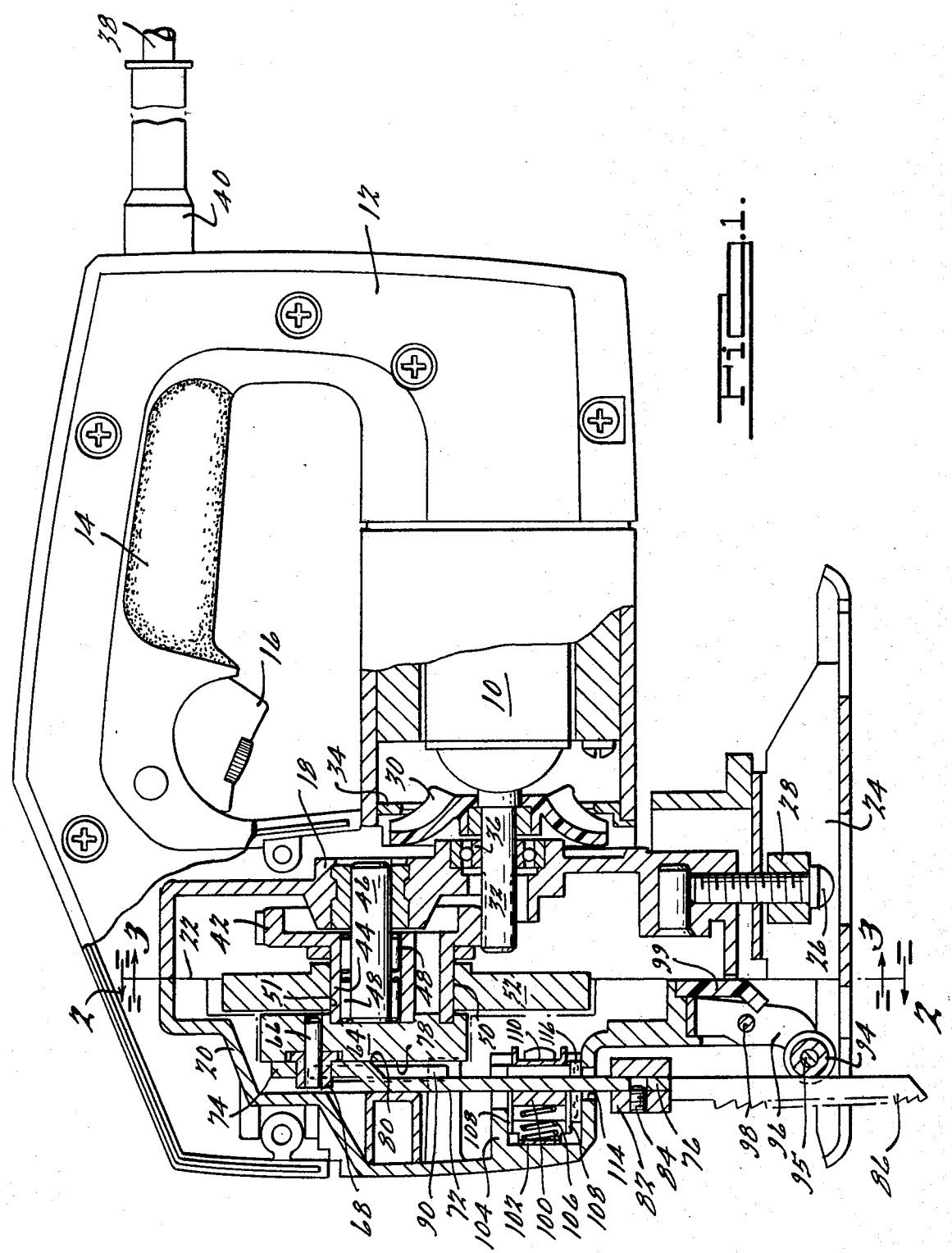
FIG. 1 is a side elevational view, partly in longitudinal section, illustrating a jig saw embodying the principles of the present invention.

With reference to FIG. 1, there is illustrated a jig saw, conventional in overall layout, comprising an electric motor 10 (partly shown) disposed within and forming a part of an outer casing 12 in part defining a handle 14 from the lower surface of which projects a motor switch trigger 16. Disposed within the casing is a gear case 18 having a gear case cover 20 affixed thereto by means of bolts 21 (FIGS. 2 and 3). The mating surfaces of case 18 and cover 20 are indicated at 22. A conventional shoe 24 is affixed to the bottom of gear case 18 by means of a clamping screw 26 and clamp washer 28 in the usual manner, permitting relative rotational movement between the body of the jig saw and the shoe about a longitudinally extending axis, thereby facilitating the cutting of bevelled edges. Cooling and chip removal are facilitated by means of a fan 30 affixed to shaft 32 of motor 10 operating in cooperation with a fan baffle 34. Motor shaft 32 is journalled in a ball bearing 36 mounted in the rear wall of gear case 18. Power is supplied to the jig saw via the usual power cord 38 passing through a cord protector 40 into casing 12.

The saw blade drive mechanism is of the scotch yoke type, comprising a gear 42 having a hub 44 journalled on a shaft 46 rigidly supported in the rear wall of gear case 18, gear 42 being supported by means of needle bearings 48 and in driving engagement with teeth formed on the forward end of motor shaft 32. Hub 44 has an eccentric cylindrical outer surface 50 slidably received within and drivingly engaging a transversely elongated opening 51 in a counterweight 52. As best shown in FIG. 3, counterweight 52 is provided with vertical slots 54 and 56 in which are slidably disposed pins 58 and 60, respectively, affixed to gear case 18, to insure that counterweight 52 moves only in a vertical direction, as illustrated. Rigidly affixed to the forward end of hub 44 by means of screws 62 is a generally circular crank plate 64 having an eccentrically located pin 66 having a roller bushing 68 rotationally disposed on the forward end thereof.

Roller bushing 68, which serves as a low friction crank pin, is drivingly disposed within an arcuate slot 70 (FIG. 2) of a generally vertically extending yoke 72 having a transversely extending relatively flat "head" or upper section 74 in which slot 70 is disposed and an offset generally parallel and flat lower section 76 which serves as the saw blade carrier. Upper section 74 is adapted to slidingly engage a generally flat support surface on the front face of crank plate 64. The transition between upper section 74 and lower section 76 of yoke 72 is defined by a shoulder 80 (FIG. 1). A saw blade 86 is affixed to the lower section 76 of yoke 72 by means of a blade chuck 82 retained in place by a set of screw 84.

Unique means are provided for guiding the movement of the yoke 72 to insure that its movement will be limited to reciprocation in a longitudinal plane with substantially no rotation about a vertical axis. This guiding is accomplished at the upper end of yoke 72 by the engagement of the upper section 74 with support surface 78 on crank plate 64 and, in addition, by the engagement of the transverse edges of upper section 74 with inwardly directed vertical bearing surfaces 88 of a pair of guide bars 90 mounted in suitably shaped pockets in the front wall of gear case cover 20 in the manner best illustrated in FIGS. 2 and 4. Guide bars 90 also have rearwardly facing bearing surfaces 92 for the purpose of retaining the track 70 of yoke 72 in driving engagement with crank pin 68.

As shown best in FIGS. 1 and 2, the lower end of the yoke and saw blade assembly is preferably guided by means of a slotted roller 94 rotationally mounted on a pin 95 carried on a pair of downwardly extending arms 97 forming part of a U-shaped support bracket 96 fixedly mounted to gear case cover 20 by means of a pin 98. Slotted roller 94 rollingly engages the trailing edge of saw blade 86 in all operative positions thereof. An additional bracket member 99 located rearwardly of roller support bracket 96 is provided with a depending portion that is angled to direct air from the fan 30 toward the workpiece to facilitate chip removal. The yoke and saw blade assembly is constantly biased into engagement with roller 94 and support surface 78 of crank plate 64 by means of an intermediate guide bearing best illustrated in FIGS. 1, 2 and 5, comprising an H-shaped slide bearing 100 slidably disposed within a sheet metal cage 102 positioned in a suitably shaped opening in a boss 104 formed in the forward wall of gear case cover 20. Slide bearing 100 is mounted for sliding movement in a fore-and-aft direction and is biased in a rearward direction against yoke 72 by means of a compression spring 106 disposed between the forward wall of cage 102 and the opposed surface of slide bearing 100. The lateral sides of cage 102 have inwardly directed flanges 108 at the upper and lower edges thereof (FIGS. 2, 4 and 5) to retain slide bearing 100 in a vertical direction. The intermediate guide bearing is retained in place by means of a clamp bracket 110 retained against the rearward face of boss 104 by a threaded fastener 112. Contaminants are prevented from entering the gear case through opening 114 by means of a laminated rubber and felt seal 116 which sealingly rides on the surface of the lower section 76 of yoke 72.

Because of the improved carrier guide means of the preferred embodiment, manufacturing tolerances are less critical and yoke 72 may be inexpensively fine blanked in one piece. This, along with the elimination of the usual upwardly extending stem for upper bearing purposes, significantly reduces the overall weight of the yoke mechanism. In addition, clamp 82 may be relatively low mass because the side of the lower section 76 of yoke 72 may be used for one of the blade clamping surfaces. Furthermore, the relatively wide face on upper section 74 of yoke 72 reduces unit pressures on the frictional surfaces, thereby reducing overall friction, wear and heat, and increasing efficiency. This wide face (and the attendant large moment arm) also improves blade alignment and provides high resistance to rotation of the blade about a vertical axis. Additional features and advantages of the yoke and saw blade assembly are described in greater detail in copending U.S. application, Ser. No. 050,042, filed June 19, 1979, entitled "Jig Saw", and assigned to the assignee of the present invention.

As can be readily visualized, rotation of motor shaft 32 will impart a vertical oscillatory movement to counterweight 52 and rotation to crank plate 64, and the action of roller bushing 68 engaging the inside peripheral surface of arcuate slot 70 will cause vertical reciprocation of yoke 72 and saw blade 86 affixed thereto. To effect the desired counterbalancing of the respective parts, counterweight 52 moves 180 degrees out of phase with yoke 72, the mechanism shown in FIG. 1 illustrating the crank pin 68 at its top dead-center position and the counterweight 52 at its lowermost position.

Turning now to FIGS. 6 and 7, the advantages of the curved track yoke design of the present invention will now be explained. In FIG. 6, a yoke 72 having a conventional straight track 70' is shown. As will be apparent to those skilled in the art, the blade load and crank load forces, being parallel non-collinear forces of equal magnitude acting in opposite directions, form a couple that is imposed on the reciprocating yoke shaft 76. In addition, the moment of the couple, which is defined by the product of the magnitude of one of the forces and the perpendicular distance between the lines of action of the forces (herein designated by the letter "a"), is greatest at the mid-stroke position illustrated where the perpendicular distance "a" is greatest. Thus, a substantial pressure is exerted by the couple against the yoke guide 90, causing friction and subsequent heat generation. Moreover, since the bearing load factor imposed on the yoke guide 90 is directly related to the product of the pressure exerted and the velocity of the yoke 72, it will be appreciated that the frictional forces generated are actually maximized by the straight track design since both the pressure and velocity factors are greatest at the same points during the stroke. Consequently, substantial wear and heat buildup can occur, especially under high load conditions.

With the curved track yoke design of the present invention illustrated in FIG. 7, on the other hand, the curvature of the track 70 is such that at mid-stroke the radially directed crank load projects through the center of the shaft bearing 100. In other words, the radius of curvature of the yoke track 70 is selected to equal the distance between the crank pin 68 and the center of the shaft bearing 100 when the yoke 72 is at its mid-stroke position, as shown. In this manner, the couple normally imposed on the shaft of the yoke by the blade and crank loads is eliminated. Hence, the friction and wear typically associated with the yoke guide 90 are substantially reduced. Moreover, these advantages are realized without an attendant increase in the load imposed on the shaft bearing 100. It will be appreciated, however, that the curved track yoke of the present invention will result in a slight increase in the contact stress on the curved track surface and the contact roller 68. However, this increase is insignificant compared to substantial reductions in friction, wear and heat generation realized at the yoke guides 90.

In addition, it will be understood that curvature of the yoke tract 70 could be altered to virtually eliminate the guide loads at any given point during the stroke by varying the radius of curvature to correspond to the distance between the crank pin 68 and the center of the shaft bearing 100 at that point during the stroke. However, since guide loading is most severe around the vicinity of the two mid-stroke positions where the velocity of the yoke 72 is greatest, for purposes of the preferred embodiment, the configuration illustrated in FIG. 7 is used.

Thus, it can be seen that the present invention provides a novel curved track yoke design for a jig saw that substantially eliminates the load forces normally imposed on the yoke guides, thereby significantly reducing part wear, friction and heat generation.

While the above description constitutes the preferred embodiment of the present invention, it will be appreciated that the invention is susceptible to modification, variation and change without departing from the proper scope or fair meaning of the accompanying claims.

What is claimed is:

1. In a reciprocating scotch yoke drive mechanism for a power tool including a crank plate, an eccentrically located crank pin secured to said crank plate and drivingly disposed within an aperture in a yoke member having a shaft portion and a transversely extending head portion containing said aperture, and bearing means defining a support for said shaft for determining the reciprocal axis for said yoke member; the improvement wherein said aperture is curvilinear and wherein the radius of curvature of said aperture is equal to the distance between said crank pin and a point on the axis of said shaft adjacent said bearing means when said yoke is at its mid-stroke position.

2. The drive mechanism of claim 1 wherein said bearing means includes means for biasing said yoke against said crank plate so that said head portion bears against the surface of said crank plate.

3. The drive mechanism of claim 1 further including guide means for guiding the reciprocal movement of the head portion of said yoke.

4. The drive mechanism of claim 3 wherein said guide means includes a pair of transversely spaced guide surfaces engaging the transverse ends of said head portion for limiting transverse movement thereof.

5. In a reciprocating scotch yoke drive mechanism for a power tool including a motor, a rotary crank plate drivingly connected to said motor, an eccentrically disposed crank pin affixed to said crank plate and projecting outwardly therefrom, a yoke member having a shaft portion and a transversely extending head portion having an aperture therethrough in which said crank pin is drivingly disposed, bearing support means engaging the shaft of said yoke for determining the reciprocal axis of said yoke member, and guide means for guiding the reciprocal movement of said head portion; the improvement wherein said aperture has a curved shape and the radius of curvature is equal to the distance between said crank pin and a point on the axis of said shaft adjacent said bearing support means when said yoke is at its mid-stroke position.

6. The drive mechanism of claim 5 wherein said bearing support means includes means for biasing said yoke against said crank plate so that the head portion of said yoke bears against the surface of said crank plate.

7. The drive mechanism of claim 5, wherein said guide means comprises a pair of transversely spaced guide surfaces engaging the transverse ends of said head portion for limiting transverse movement thereof.

8. In a reciprocating drive mechanism for a saw including a motor, a rotary crank plate drivingly connected to said motor, an eccentrically disposed crank pin affixed to said crank plate and projecting outwardly therefrom, a yoke member having a lower shaft portion and a transversely extending upper portion having an aperture therethrough in which said crank pin is drivingly disposed, upper guide means engaging the transverse ends of said upper portion for limiting transverse movement thereof, intermediate bearing support means engaging said shaft for determining the reciprocal axis of said yoke, a saw blade coupled to the shaft of said yoke, and lower guide means engaging the trailing edge of said saw blade for guiding the reciprocal movement of said saw blade; the improvement wherein the aperture of said upper portion is curved in shape and the radius of curvature of said aperture is substantially equal to the distance between said crank pin and a point on the axis of said shaft adjacent said intermediate bearing support means when said yoke is at its mid-stroke position.

9. The drive mechanism of claim 8 wherein said intermediate bearing support means includes means for biasing said yoke against said crank plate so that said upper support bears against the surface of said crank plate in all operative positions of said yoke.

10. A reciprocating scotch yoke drive mechanism for a power tool having a housing, and a motor mounted in the housing, comprising:
    (a) a crank plate drivingly, connected to the motor and rotatable through 360°,
    (b) a crank pin eccentrically located on the crank plate,
    (c) a yoke member having a shaft portion extending longitudinally along an axis and a head portion at one end of the shaft portion,
    (d) the head portion extending transversely in opposite directions from the axis of the shaft portion and terminating in end surfaces,
    (e) the head portion further defining an arcuate aperture in which is drivingly disposed the crank pin,
    (f) first bearing means connected to the housing and having bearing surfaces parallel to the axis of the shaft portion for slidably engaging the head portion end surfaces,
    (g) second bearing means connected to the housing and engaging the shaft portion for guiding the reciprocating movement of the yoke member, and
    (h) the radius of curvature of the aperture being substantially equal to the distance between the crank pin and a point on the axis of the shaft portion adjacent the second bearing means when the yoke member is at mid-stroke, whereby bearing loads are reduced, at least at the first bearing means.

11. The combination claimed in claim 10 wherein the second bearing means includes means for biasing the yoke member against the crank plate.

12. The combination claimed in claim 11, further comprising:
    (a) a saw blade connected to the shaft portion and having a trailing edge, and
    (b) means connected to the housing and engaging the trailing edge for guiding the reciprocating movement of the saw blade.

* * * * *